(12) United States Patent
Plow et al.

(10) Patent No.: US 6,462,750 B1
(45) Date of Patent: Oct. 8, 2002

(54) ENHANCED IMAGE EDITING THROUGH AN OBJECT BUILDING VIEWPORT

(75) Inventors: Gregory Maurice Plow, Gilroy; Farrokh E. Pourmirzaie, San Jose, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/389,787

(22) Filed: Sep. 3, 1999

(51) Int. Cl.$^7$ ................................................. G06T 5/00
(52) U.S. Cl. ...................................................... 345/619
(58) Field of Search ................................ 345/642, 433, 345/419, 619, 661, 665, 795, 796, 650, 654, 676, 680

(56) References Cited

U.S. PATENT DOCUMENTS

| | | | |
|---|---|---|---|
| 4,665,555 A | | 5/1987 | Alker et al. |
| 5,151,974 A | | 9/1992 | Tani et al. |
| 5,428,721 A | * | 6/1995 | Sato et al. |
| 5,467,441 A | * | 11/1995 | Stone et al. |
| 5,588,103 A | | 12/1996 | Aoyagi |
| 5,805,171 A | * | 9/1998 | St. Clair et al. |
| 5,818,455 A | * | 10/1998 | Stone et al. |

* cited by examiner

*Primary Examiner*—Jeffery Brier
(74) *Attorney, Agent, or Firm*—Sawyer Law Group LLP

(57) ABSTRACT

A method and system for a user to edit or view a graphical image, the graphical image comprising a plurality of graphic objects, is disclosed. The method comprises the steps of providing a view of a graphical image and creating an object building viewport based upon a first user interaction wherein the view of the graphical image at least partially within the viewport is displayed. The method further comprises the step of excluding graphic objects from the viewport based upon a second user interaction to create a simplified view of the graphical image. Through the use of a system and method in accordance with the present invention, a user can achieve an ideal view of a specific graphical image or portion thereof for the purpose of examination or accomplishing various editing tasks. This ideal view facilitates graphic object visualization, selection and modification, unencumbered by the distortion or obfuscation created by the display of graphic objects unnecessary to the operation at hand.

30 Claims, 17 Drawing Sheets

10

Assembled Filter Housing

1. Clear Plastic Back Plate

2. Mounting Screws

3. Wire Mesh Filter

4. Metal Retaining Plate

6. Retaining Bolt

"Move-to-Back" the Bolt

"Move-to-Back" the Metal Retaining Plate

"Move-to-Back" the Wire Mesh Filter
Note: Center Screw Still Obstructed

Move Bolt to Side to Expose Center Screw

ENHANCED IMAGE EDITING THROUGH AN OBJECT BUILDING VIEWPORT

FIELD OF INVENTION

The present invention relates generally to a system and method for the use of an application tool that allows the user to edit or examine specific portions of graphical images.

BACKGROUND OF THE INVENTION

Computer graphics systems for the desktop are becoming more powerful, more sophisticated and more popular. Engineers, graphic designers and scientists are utilizing these systems to enhance their job productivity. Ease of use has also resulted in increased casual usage for personal enjoyment.

Whether designing the next space station or creating a special graphical image for an Internet birthday card greeting, a common problem exists when interfacing with today's computer graphic systems. Conventional graphical drawings consist of images within the drawing. These images consist of one or more graphic objects. The problem relates to the difficulty for the user of the system to visualize, select and manipulate portions in an image that are invisible, distorted, or only partially viewable because of other graphic objects overlaying or otherwise interfering with the graphic objects of interest at a particular location within the image. To further describe this problem, refer now to the following discussion in conjunction with the following figures. FIG. 1 represents a typical graphical image of an assembled filter housing 10. FIG. 2 represents the graphic objects that the filter housing 10 is composed of. These graphic objects (in their respective layered order) are a clear plastic back plate 12, mounting screws 14, a wire mesh filter 16, a metal retaining plate 18, and a retaining bolt 20.

Current technology provides various tools for dealing with this problem. Frequently, users of computer graphic systems will utilize the "move to front", "move to back", "move back one" and "move forward one" tools to cycle temporarily unneeded graphic objects to the back so that graphic objects of interest can be viewed unencumbered by the graphic objects previously layered on top of the graphic object of interest. Using this conventional methodology, if a designer wants to see the mounting screws 14, he is going to have to "move to back" the retaining bolt 20, the metal retaining plate 18, and the wire mesh filter 16 (see FIGS. 3–5). At this point, the center mounting screw is still obscured because of the color of the retaining bolt 20 (see FIG. 5). Accordingly, the designer has to move the retaining bolt 20 to the side in order to see all the mounting screws (see FIG. 6). Consequently, this process can be problematic and inefficient.

First, these operations are actually modifying the graphical image and the user has the burden of remembering the reverse operations for restoring graphic object relationships back to their original state. This can be difficult and problematic where combinations of operations have been used to temporarily create a modified view needed for the editing of the image. Furthermore, where some graphic objects at various levels are needed and others interfere, it may be impossible to obtain the ideal view for efficient editing of the graphical image no matter how much the graphic objects are rearranged.

Another tool allows the user to create a graphical image in layers. This tool is typically used by more sophisticated users, but also has inherent weaknesses. A user of this tool can make one or more layers of an image "invisible" and "locked", whereby the complexity of the image is reduced and needed editing can proceed unencumbered by the other layers. However, on complex images, it is frequently found that multiple overlaying graphic objects occur within the scope of a single layer. Consequently, it is difficult to plan ahead so that the layering scheme established in the beginning comprehends all future editing tasks that may arise. Accordingly, what is needed is a simple, flexible tool to achieve the ideal view for any needed examination of editing of a graphical image or graphical image layer.

SUMMARY OF THE INVENTION

A method and system for a user to edit or view a graphical image, the graphical image comprising a plurality of graphic objects, is disclosed. The method comprises the steps of providing a view of a graphical image and creating an object building viewport based upon a first user interaction wherein the view of the graphical image at least partially within the viewport is displayed. The method further comprises the step of excluding graphic objects from the viewport based upon a second user interaction to create a simplified view of the graphical image.

Through the use of a system and method in accordance with the present invention, a user can achieve an ideal view of a specific graphical image or portion thereof for the purpose of examination or accomplishing various editing tasks. This ideal view facilitates graphic object visualization, selection and modification, unencumbered by the distortion or obfuscation created by the display of graphic objects unnecessary to the operation at hand.

BRIEF DESCRIPTION OF DRAWINGS

FIG. 2 shows the graphic objects that the conventional graphical image is composed of.

DETAILED DESCRIPTION OF THE INVENTION

The present invention provides a method and system for editing or examining a graphical image or graphical image layer. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments shown but it is to be accorded the widest scope consistent with the principles and features described herein.

A method and system in accordance with the present invention is disclosed in the context of a preferred embodiment. The preferred embodiment allows for the implementation of an application tool that provides a user the ability to create simplified views of graphical images for examination or editing purposes. Through the use of a system and method in accordance with the present invention, a user can achieve an ideal view of a graphical image or portion thereof for the purpose of examination or accomplishing various editing tasks. This ideal view facilitates graphic object visualization, selection and modification, unencumbered by the distortion or obfuscation created by graphic objects unnecessary to the editing operation at hand.

In a preferred embodiment, an object building viewport is created by a user. The object building viewport is utilized to display an ideal view of a graphical image or portion thereof for the purpose of examination or accomplishing various editing tasks. Although the present invention discloses an object building viewport, one of ordinary skill in the art will readily recognize that the present invention can be implemented in any type of viewport while remaining within the spirit and scope of the present invention.

Preferably, the object building viewport is created using a desktop tool that can be selected by the user. Preferably, the desktop tool is located within an application toolbar. Once the tool is selected, the cursor changes its configuration and the object building viewport is preferably created through the conventional "click, hold and drag" method. In a preferred embodiment, a mouse can be utilized to place the cursor at the desired location of the upper left hand corner of the viewport. The mouse button is then depressed and held while the mouse is used to drag the cursor to the desired location of the lower right hand corner of the viewport. The mouse button is then released. However, one of ordinary skill in the art will readily recognize that a variety of other methods could be used to create an object building viewport. For example, a default object building viewport of a predetermined size and location could be created by selecting the "create object building viewport" command from a menu.

Figure 1:
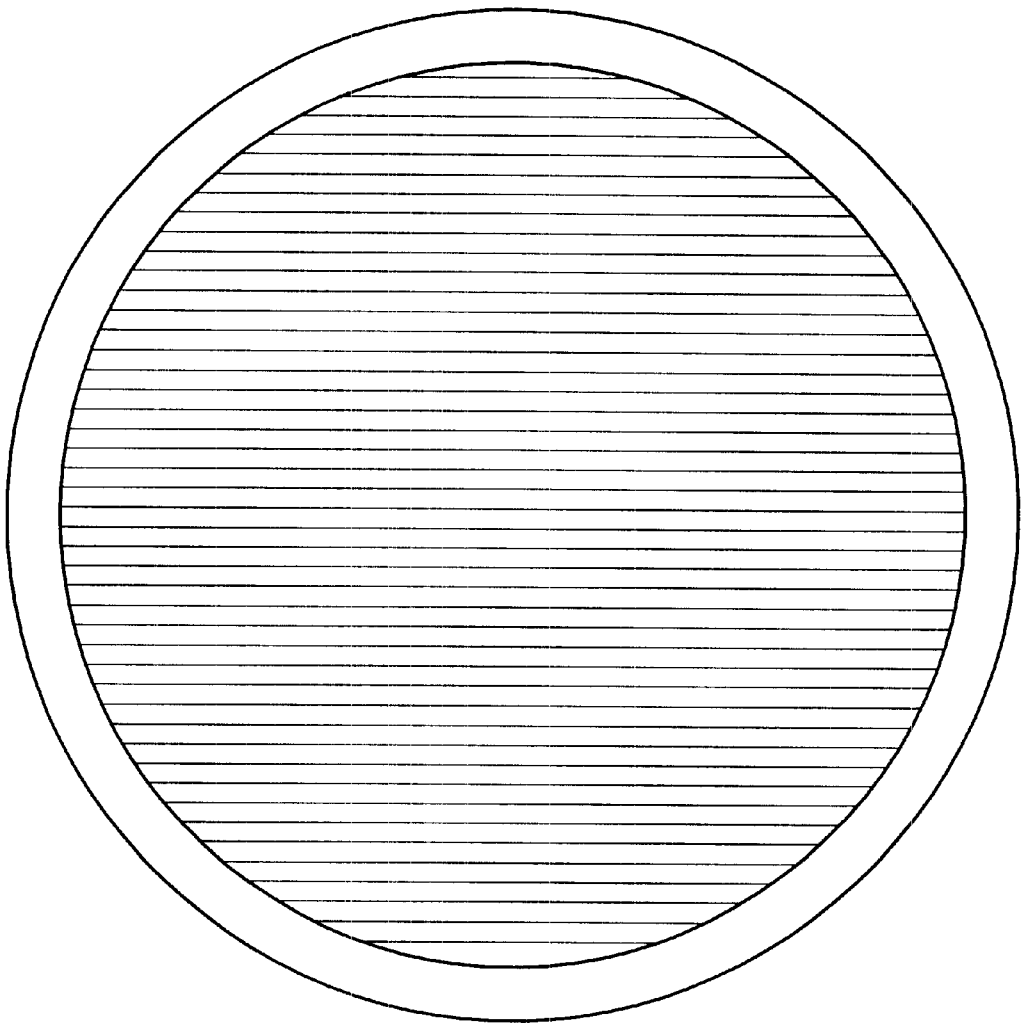
FIG. 1 shows a conventional graphical image.
Figure 2:
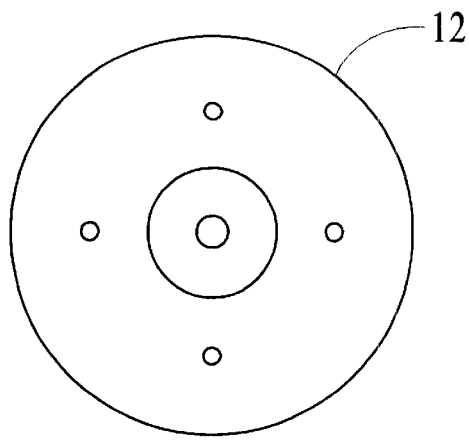
Figure 2:
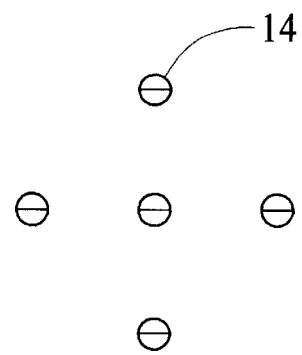
Figure 2:
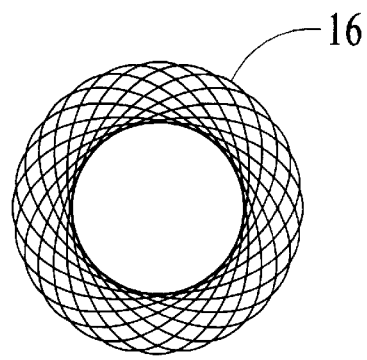
Figure 2:
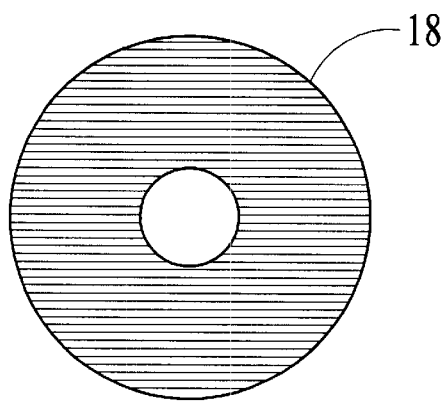
Figure 2:
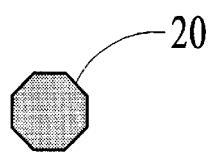
Figure 3:
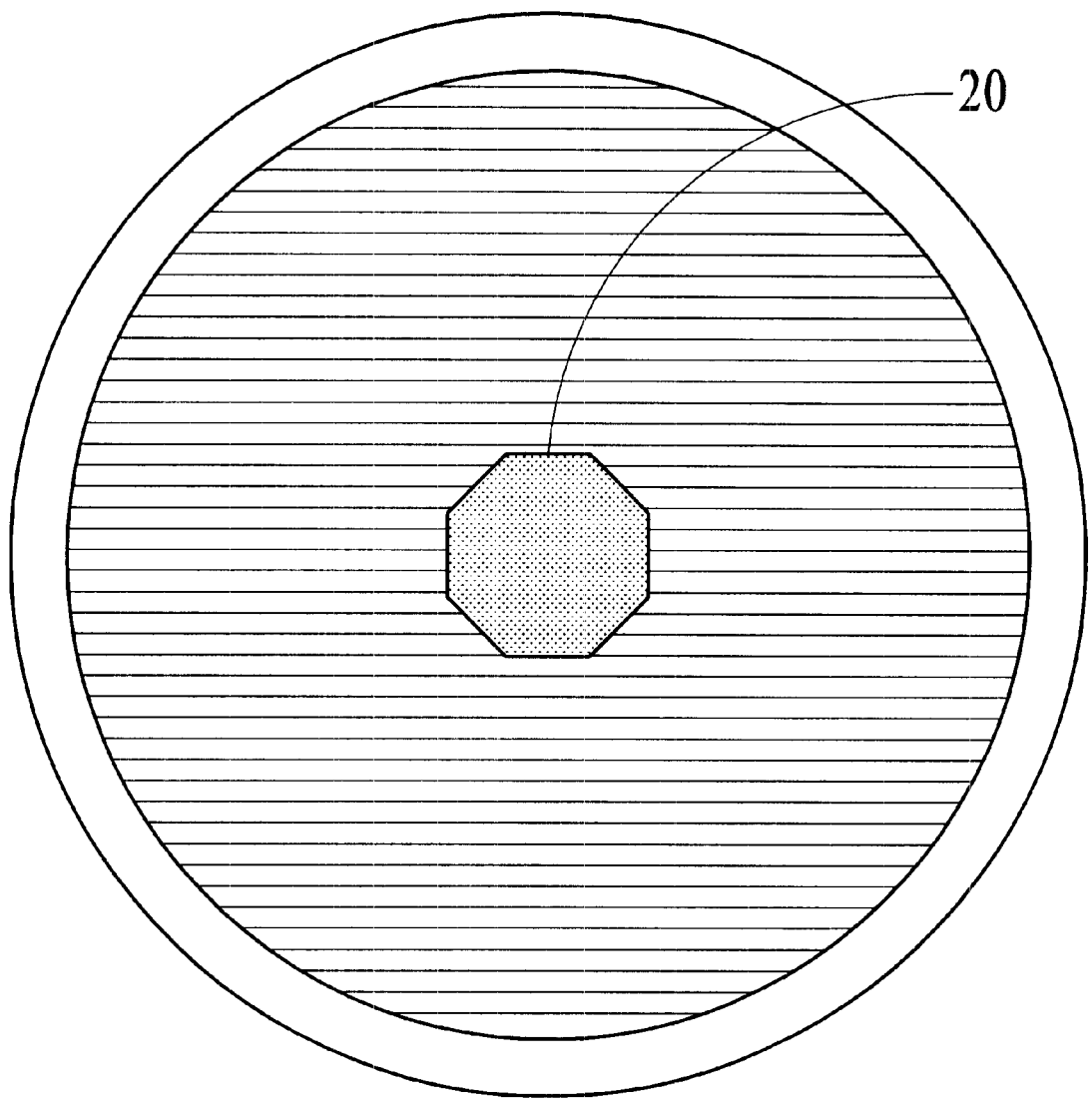
FIG. 3 depicts the "move to back" operation of the retaining bolt.
Figure 4:
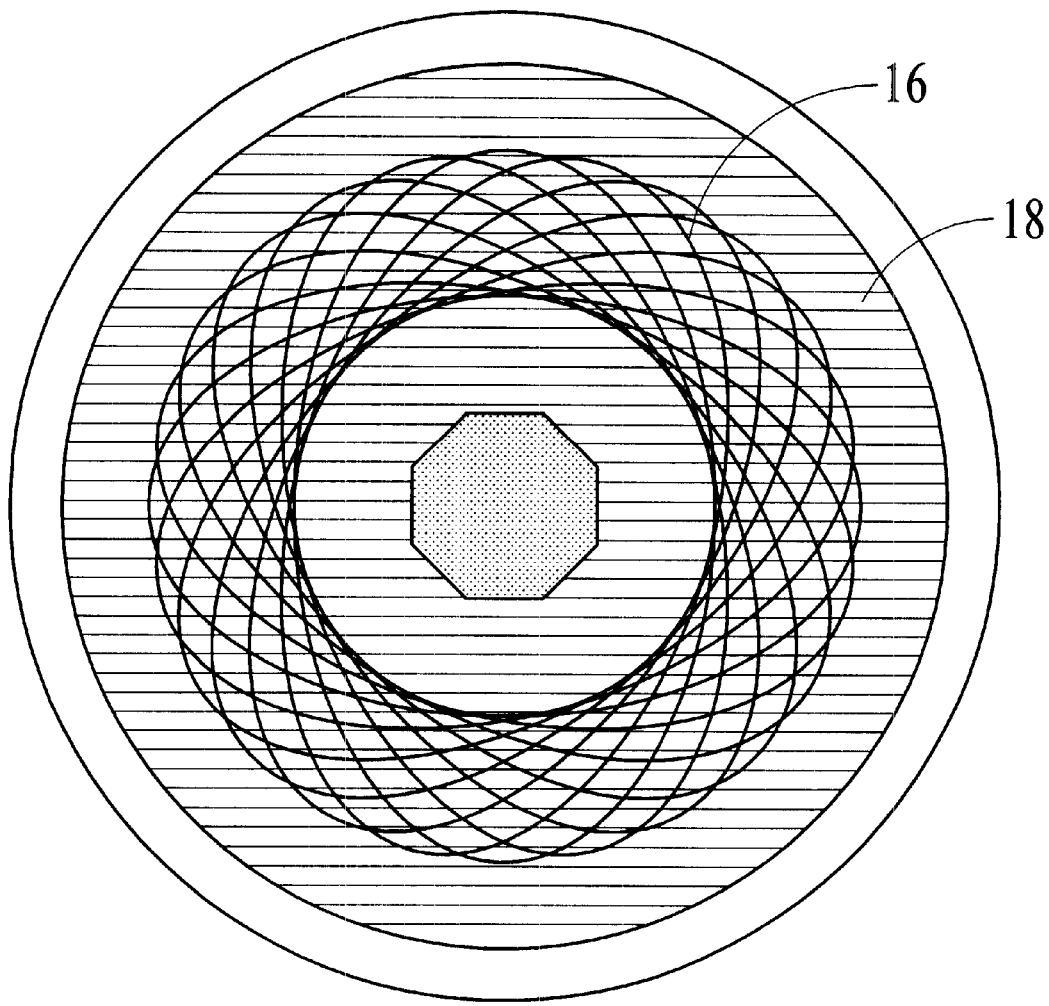
FIG. 4 depicts the "move to back" operation of the metal retaining plate.
Figure 5:
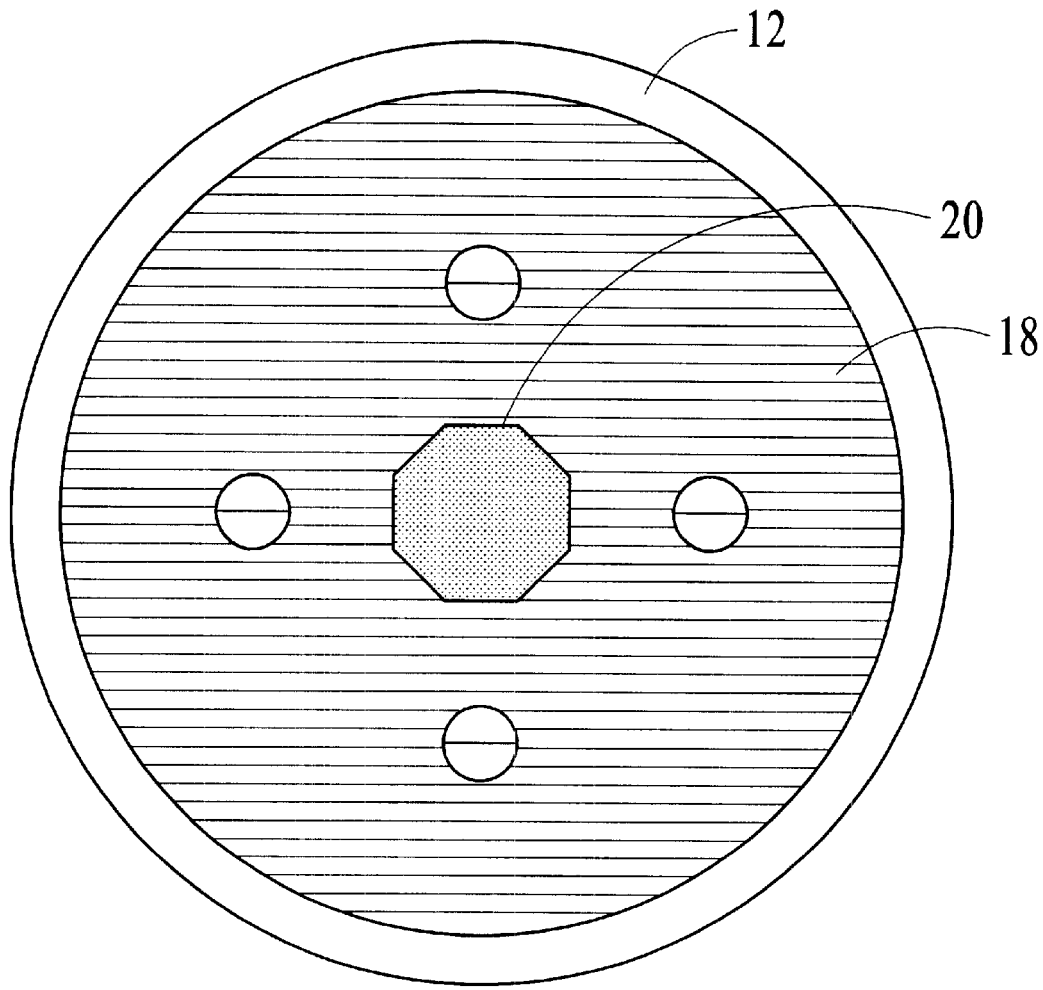
FIG. 5 depicts the "move to back" operation of the wire mesh filter.
Figure 6:
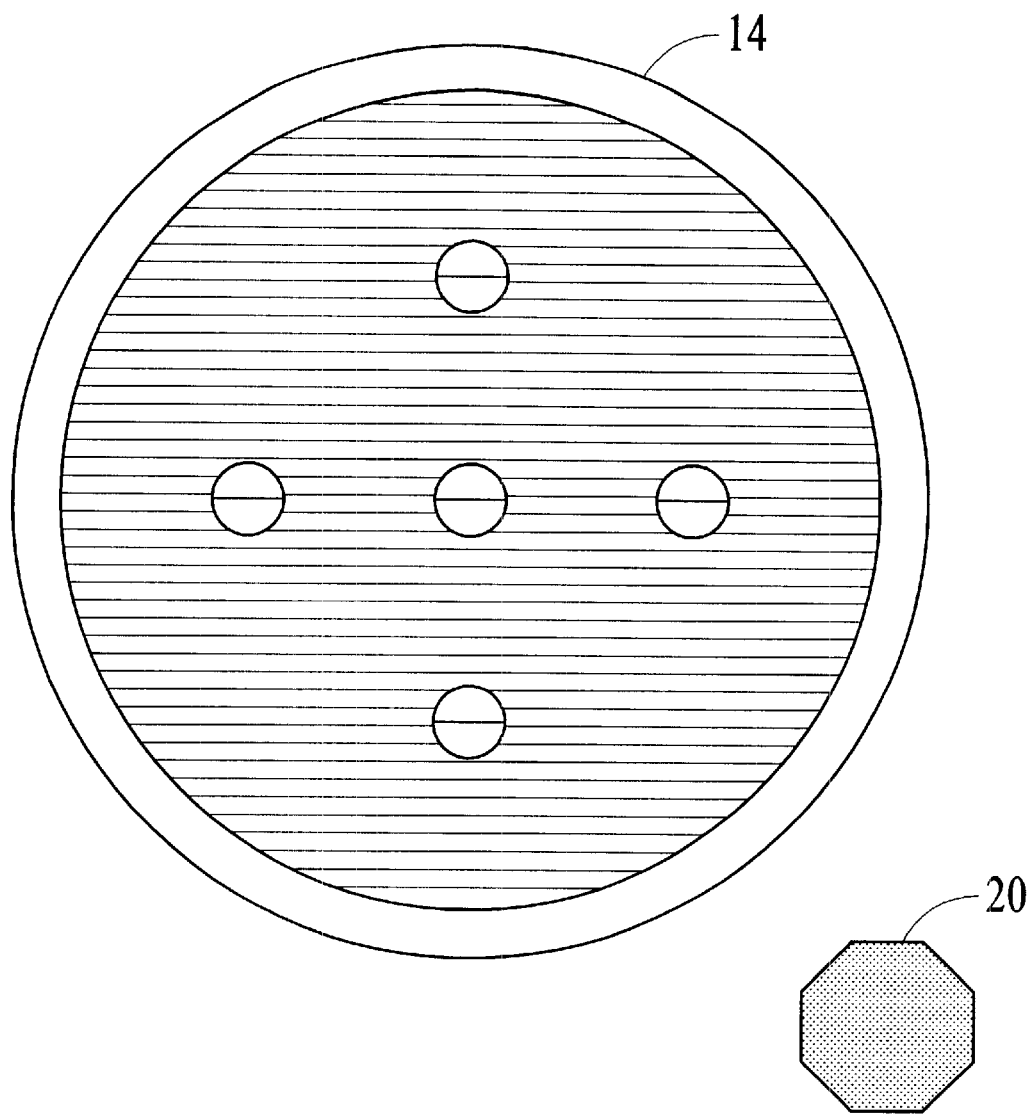
FIG. 6 depicts the unobstructed view of the mounting screws through conventional methods.
Figure 7:
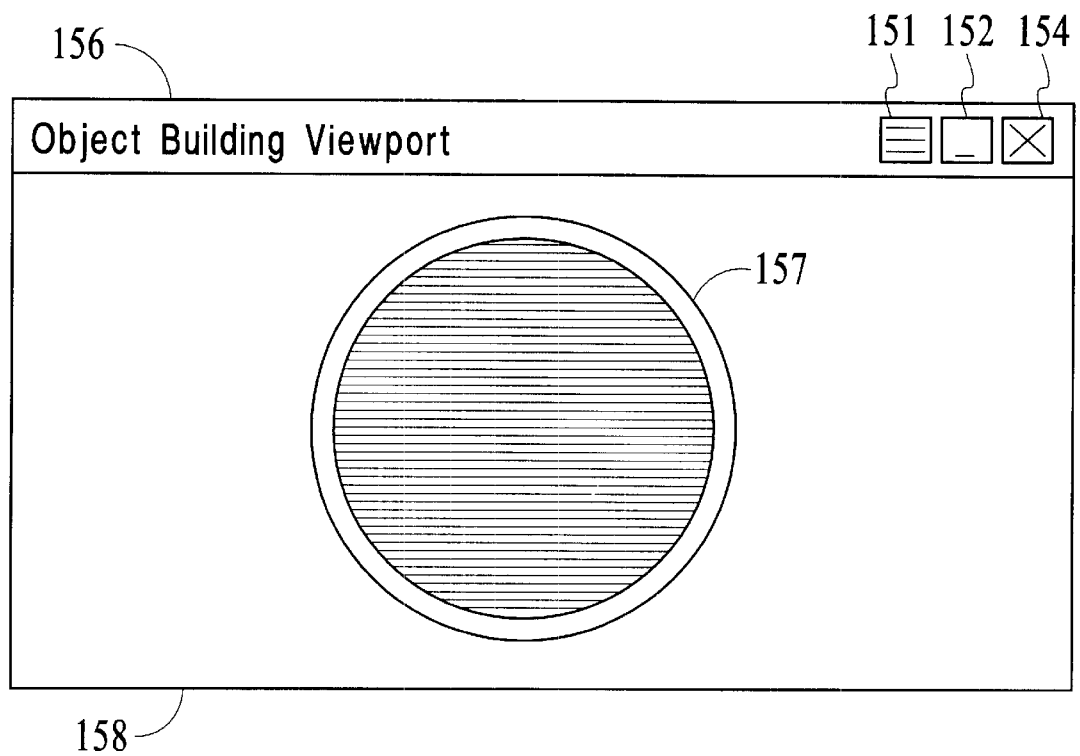
FIG. 7 shows an object building viewport in accordance with the present invention.

FIG. 7 represents an object building viewport 150 in accordance with the present invention. The viewport 150 includes an area 158 for encompassing an image 157 or portion thereof that a user intends to edit or examine and a toolbar 156. Within the toolbar 156 is a minimize all but ton 151, a minimize button 152 and a close button 154. Here, the "minimize" button 152 allows the user to make the viewport 150 temporarily invisible preferably reducing it to an icon in the operating system taskbar, for a full and unobstructed view of the graphical image. By clicking the icon in the taskbar, the viewport 150 is toggled back to the visible state. A related "minimize all" button 151, preferably makes all viewports temporarily invisible preferably by reducing them to an icon in the taskbar. Again by clicking this icon, all the viewports are toggled back to the visible state.

The object building viewport 150 may be moved or resized by conventional means at any time. Once the object building viewport 150 is created, the user preferably uses conventional mouse operations to move and/or resize the viewport 150 to the area of the image or drawing to be edited or examined with greater clarity with the temporarily simplified view. The temporarily simplified view reduces the image complexity for easier visualization, selection and modification of the graphic objects to be edited.

Figure 8:
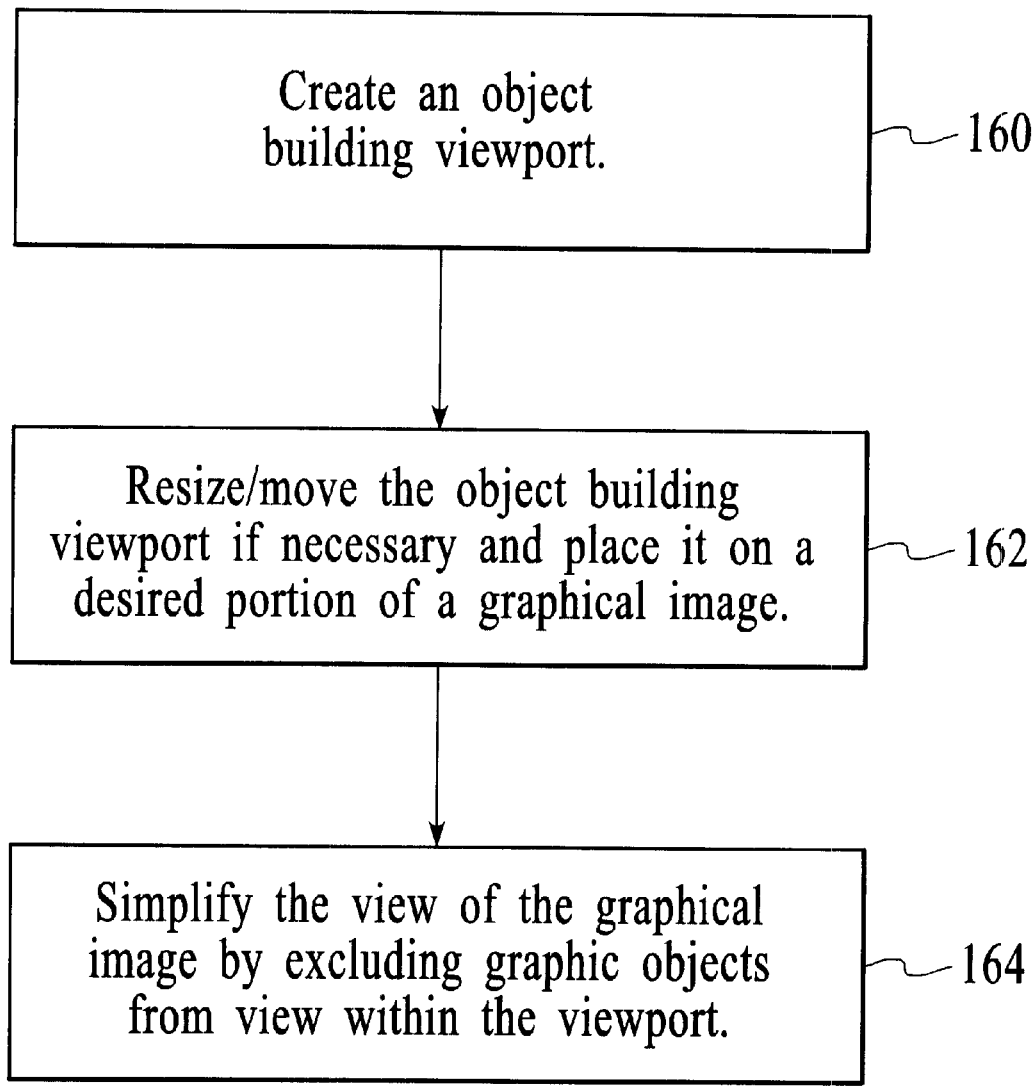
FIG. 8 is a flowchart of a method in accordance with the present invention.

To more particularly describe the operation of the method in accordance with the present invention, refer now to FIG. 8. FIG. 8 is a flowchart of a system in accordance with the present invention. First, an object building viewport is created, via step 160. Next, the object building viewport is resized/moved, if necessary, and placed on a desired portion of a graphical image, via step 162. Finally, the view of the graphical image is simplified by excluding graphic objects from view within the viewport, via step 164.

Utilizing existing graphic object-oriented programming techniques, the object building viewport provides for operations to reduce the complexity of the image view without making any modifications to the actual image in achieving the simplified view. When the user has appropriately placed and sized the object building viewport and is ready to create a temporarily simplified view for editing purposes, the user depresses the "TAB" key to begin building the simplified view. Prior to depressing the "TAB" key for the first time, the viewport displays all graphic objects beneath it; that is, the view is not changed by the viewport. This facilitates moving and sizing the viewport until the appropriate image or portion thereof for which the user desires a simplified view is displayed within the viewport.

Preferably, in response to a first depression of the "TAB" key, the image area of the viewport is cleared and a first object at least partially residing within the object building viewport is displayed to the user for inclusion or exclusion within the viewport. In response to further "TAB" depressions other graphic objects are displayed to the user, preferably in the order in which the graphic objects were created.

Although the preferred embodiment describes a graphic object selection process utilizing the order in which the graphic objects were created, one of ordinary skill in the art will readily recognize that a variety of methods could be implemented to select the order in which the graphic objects are displayed without departing from the spirit and scope of the present invention.

If the user wishes a graphic object to be a part of the simplified view, then the "ENTER" key is depressed. If not, the "TAB" key is depressed once again and the next graphic object is displayed in the object building viewport. In like fashion, the user depresses "ENTER", or not, depending upon whether a graphic object is selected for inclusion in the object building viewport. The user can also specify that a particular graphic object should be "locked" by depressing the "CTRL" key at the same time as the "ENTER" key. When a graphic object or image is "locked" it can be seen in the simplified view, but it cannot be changed.

This process continues until the last graphic object, that is fully or partially encompassed by the object building viewport, is displayed or until the user is satisfied with the view even though all graphic objects were not yet displayed. After including or excluding this final graphic object from the object building viewport or when the user is satisfied, the new simplified view is complete. All graphic objects not explicitly included are considered to be excluded. All graphic objects excluded from the object building viewport are locked and cannot be selected by any editing operations. These excluded objects are also invisible within the boundaries of the object building viewport.

Graphic objects entirely outside the object building viewport are not affected by the object building viewport. Note that at this point in time while the new simplified view is displayed within the object building viewport, no actual changes have been made to the graphical image. This is an important distinction between the method and system in accordance with the present invention and conventional methodology. If the image was "saved" at this particular point in time, the file saved would be identical to a saved file taken at the point in time immediately preceding the creation of the object building viewport. In other words, the creation of and/or movement of an object building viewport in and of itself does not modify the actual image, it only changes the view of the image displayed to the user of the system.

Figure 9:
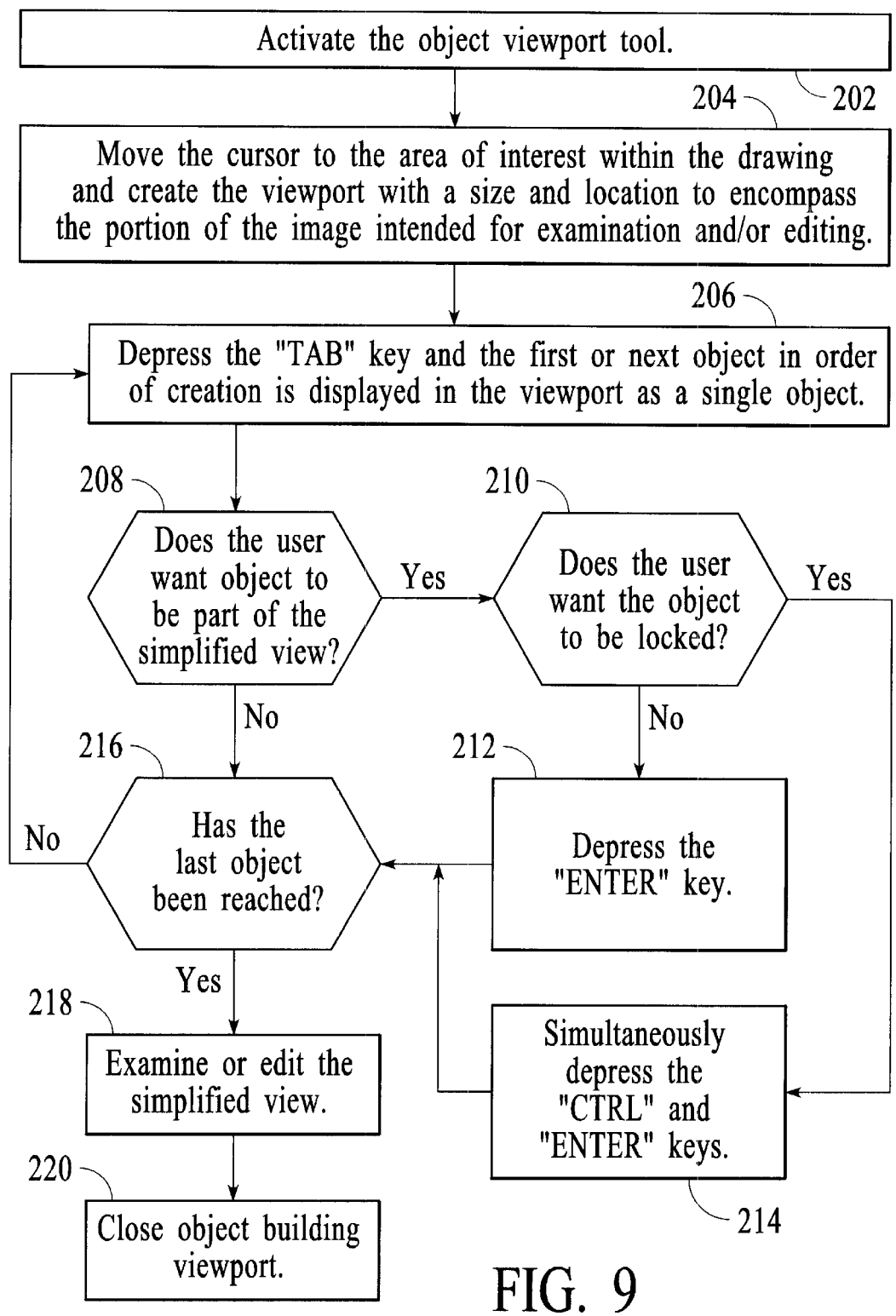
FIG. 9 is a detailed flowchart of a method in accordance with the present invention.

To more specifically describe the operation of the present invention FIG. 9 is a detailed flowchart of a method in accordance with the present invention. Once a user decides to edit or examine a specific portion of a graphical image, the user activates the object building viewport tool, via step 202. Next, the cursor changes configuration and the user moves the cursor to the area of interest and appropriately creates the viewport with size and location to encompass the portion of the image intended for examination and/or editing, via step 204. The user then depresses, for example, the "TAB" key and the next graphic object in order of object creation is displayed within the viewport as a single graphic object, via step 206. The user then decides if he wants the graphic object to be a part of the simplified view, via step 208. If not, the user continues with step 216 as described below. If so, the user decides if he wants the graphic object to be locked, via step 210. If so, the user simultaneously depresses the "CTRL" and "ENTER" keys, via step 214. Otherwise, the user depresses the "ENTER" key, via step 212. At this point whether or not the object was included, the user determines if the last graphic object of interest has been reached via step 216, and if so, begins editing or examining with the simplified view, via step 218. Otherwise, the "TAB" key is depressed to reveal the next graphic object, via step 206. Finally, upon completion of the editing operations within the object building viewport, the user closes the object building viewport, via step 220.

Preferably, if the user depresses the close button and has made any changes to the graphical image, the user is then prompted by conventional methodology (i.e. dialog box) to cancel the close command or either accept or discard the changes made to the graphical image. If the user decides to accept the changes, the portion of the graphical image coincident with the area defined by the viewport is restored to normal view but including those graphic object modifications made within the object building viewport. If the user discards the changes, the portion of the graphical image coincident with the area defined by the viewport is restored to the normal view without incorporating any changes.

If the user continues with other needed editing tasks, he may retain the graphic objects currently within the object building viewport and add others or he may remove some or all of the graphic objects currently within the object building viewport and optionally add others. Selecting a graphic object currently displayed within the object building viewport and depressing the "ESC" key removes that graphic object from the object building viewport. Just as before, depressing the "TAB" key brings in the next or first graphic object, in the order of creation, that is not already displayed within the object building viewport. This process begins where it last left off from the previous "TAB" operation and when the "most recently created" graphic object is reached, it is followed by the "first created" graphic object. This process continues, once again cycling through all graphic objects not already included, making a decision on inclusion or exclusion and then depressing the "TAB" or "ENTER" key until the desired view is attained. Selecting a non-empty object building viewport and depressing the "DEL" key removes all graphic objects from the object building viewport.

Figure 10:
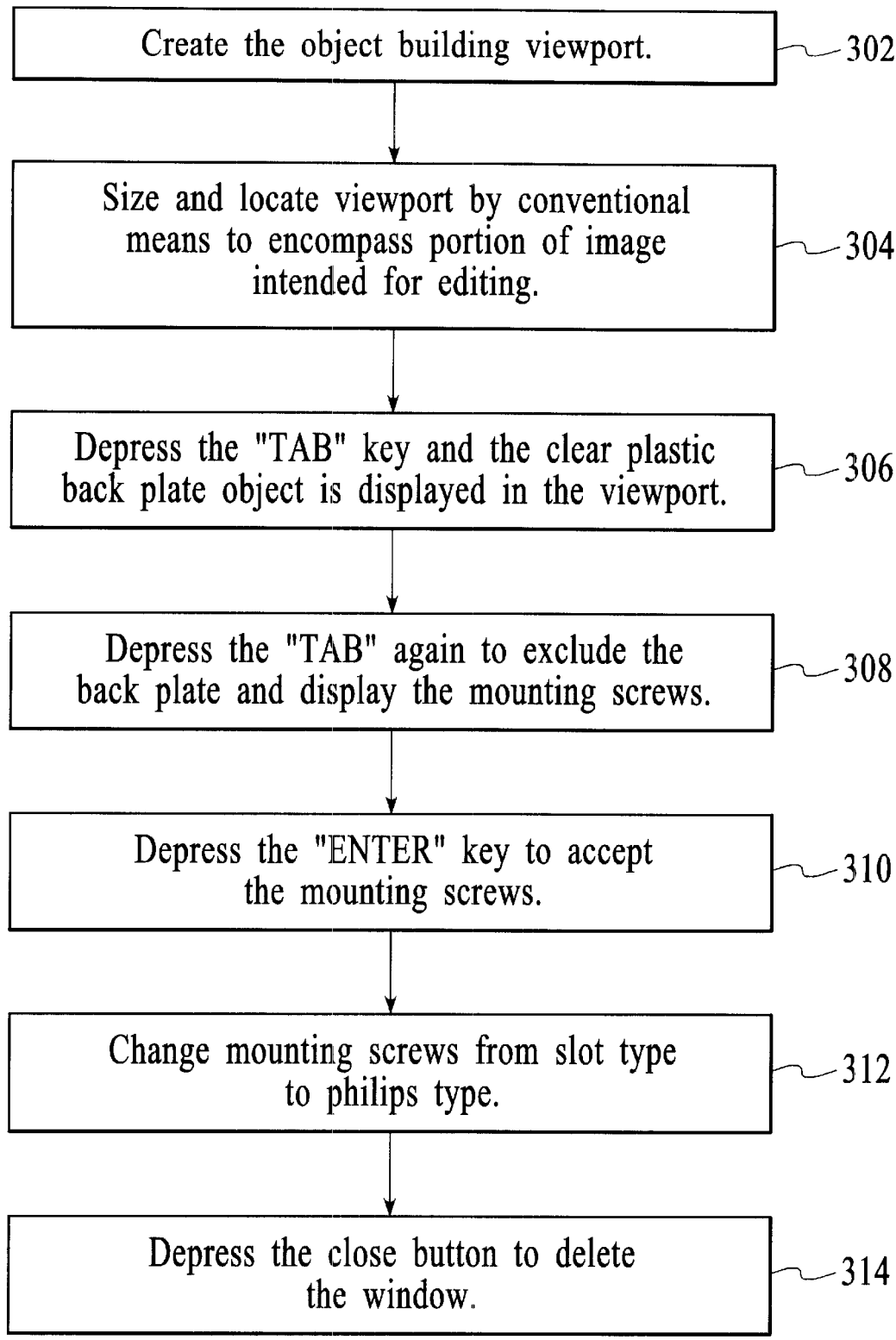
FIG. 10 is a flowchart of an example of a method in accordance with the present invention.
Figure 11:
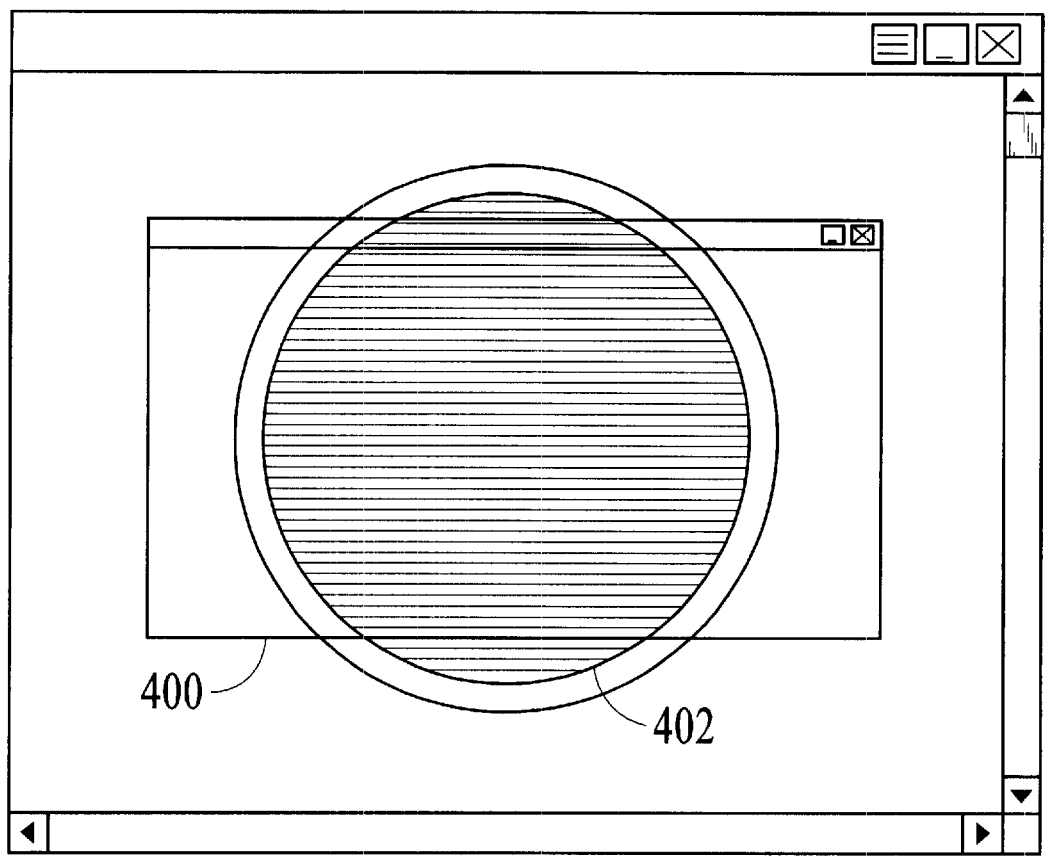
FIG. 11 is a view of an example of a system in accordance with the present invention.
Figure 12:
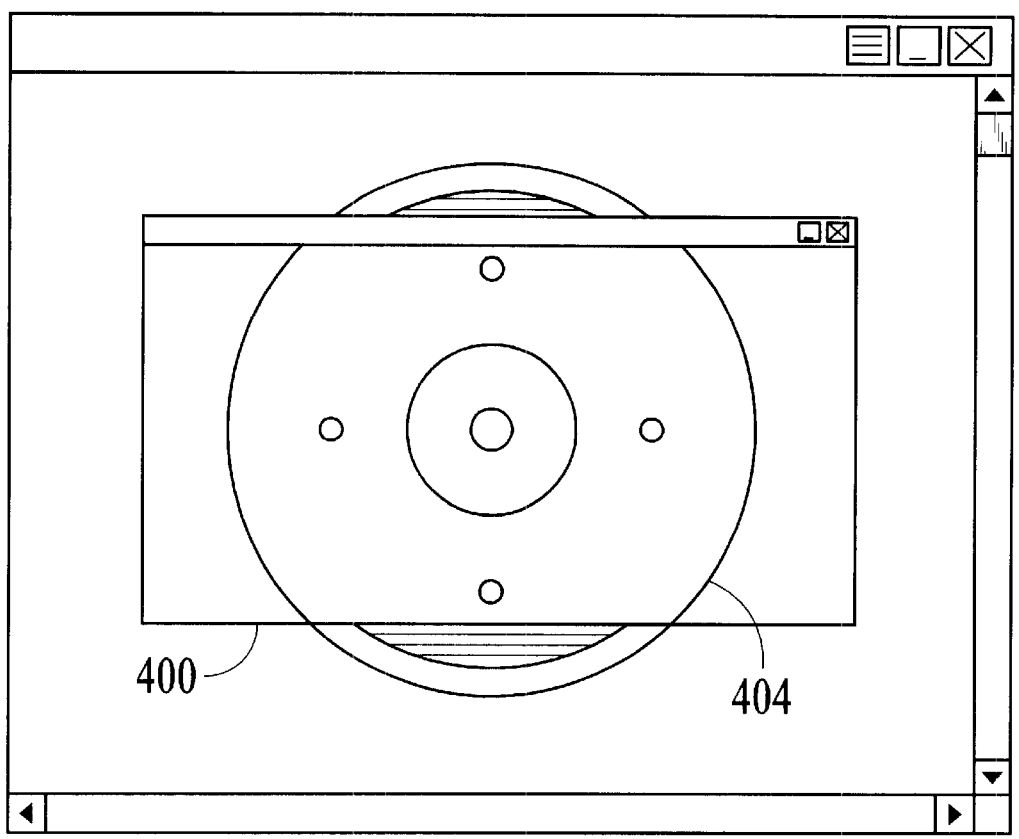
FIG. 12 is another view of an example of a system in accordance with the present invention.
Figure 13:
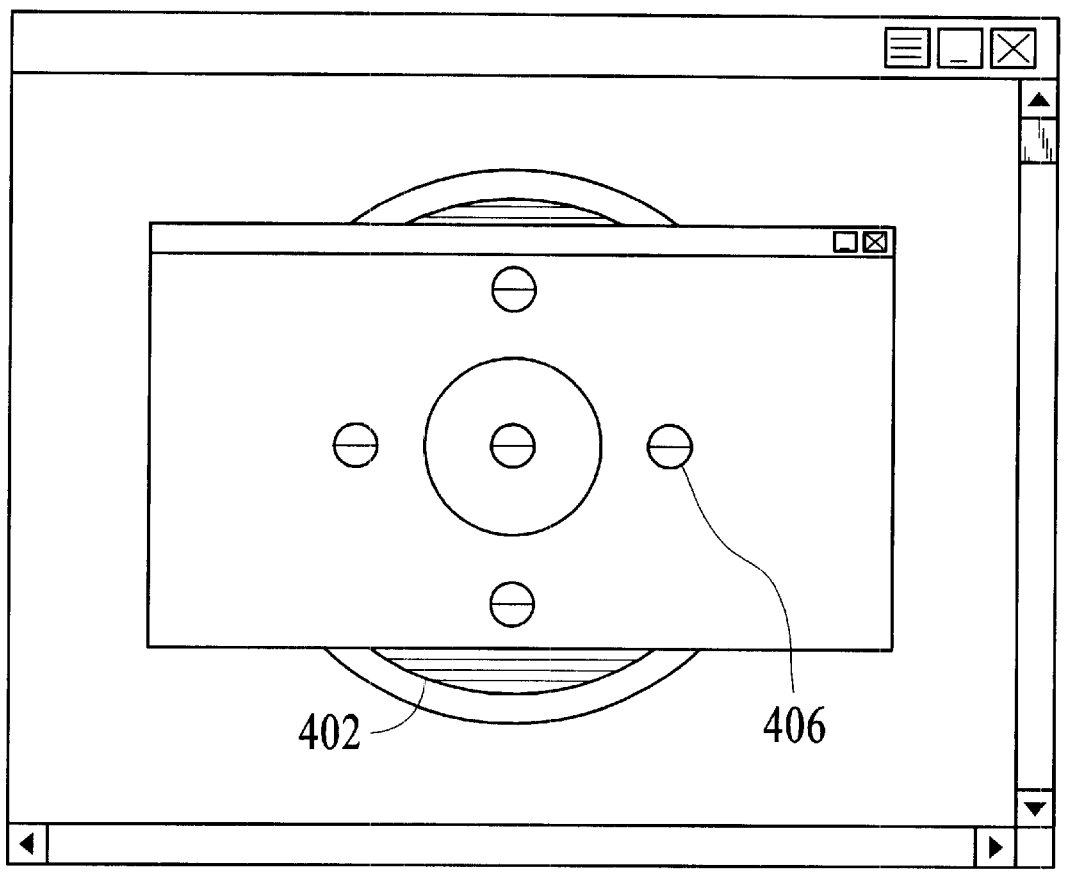
FIG. 13 is another view of an example of a system in accordance with the present invention.
Figure 14:
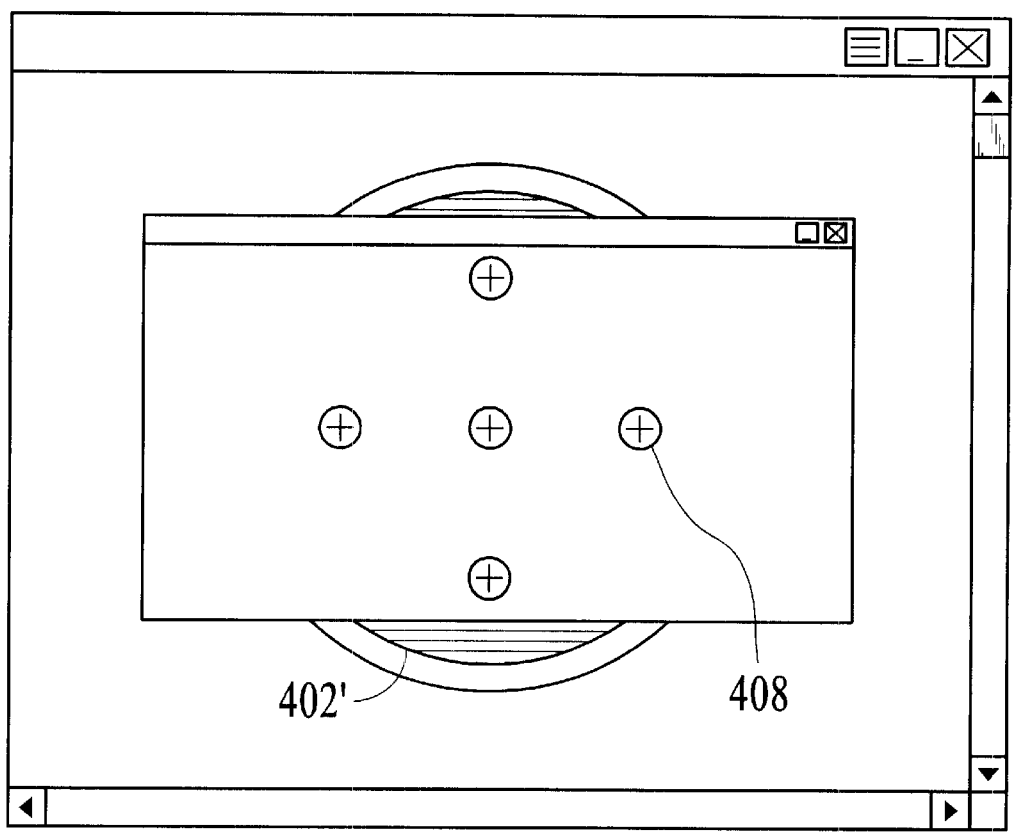
FIG. 14 represents another view of an example of a system in accordance with the present invention.
Figure 15:
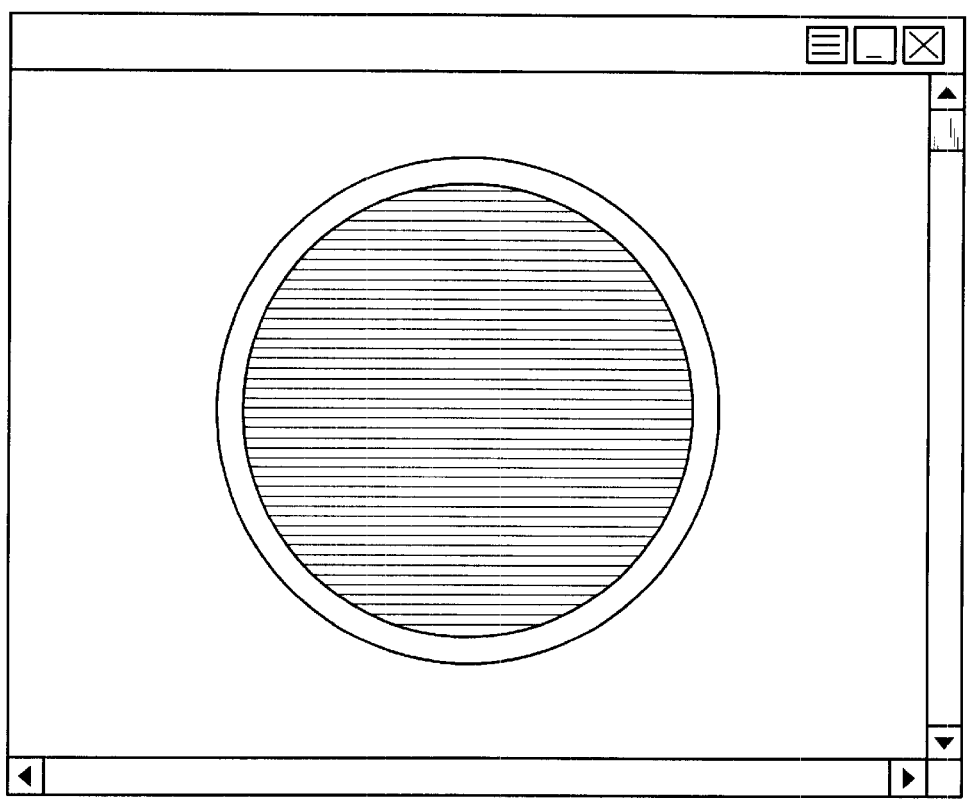
FIG. 15 is a final view of an example of a system in accordance with the present invention.

To more fully describe the operation of the present invention in the context of the preferred embodiment, FIG. 10 is a detailed flowchart of an example of the method in accordance with the present invention. FIGS. 11–15 depict views of object building viewport configurations.

In order to facilitate this example, assume that a user needs to edit the image of the assembled filter housing by changing the mounting screws from slot head screws to Philips head screws. Referring now to FIG. 10 and the accompanying perspective views, first the user creates the object building viewport 400 (see FIG. 11), via step 302. Next, the viewport 400 is located and sized by conventional means to encompass the portion of the image 402 intended for editing, via step 304. The user then depresses the "TAB" key and the clear plastic backplate graphic object 404 (the next object in order of creation) is displayed in the viewport 400 (see FIG. 12), via step 306. The user is not concerned with this graphic object, so he depresses the "TAB" key again to exclude that object and display the next graphic object in the image 402 which is the set of mounting screws 406 (see FIG. 13), via step 308. Since this is the graphic object of interest, the user depresses the "ENTER" key to accept this graphic object, via step 310. The user then changes the mounting screws 406 from the Slot type to the Philips type 408 (see FIG. 14), via step 312. Finally, the user depresses the close button to delete the object building viewport, via step 314. At this point the user can be prompted to either cancel the close command or accept or discard the changes made to the graphical image. If accepted, the original view of the assembled filter housing is now restored, but including the graphic object modification made to the mounting screws (see FIG. 15).

Figure 16:
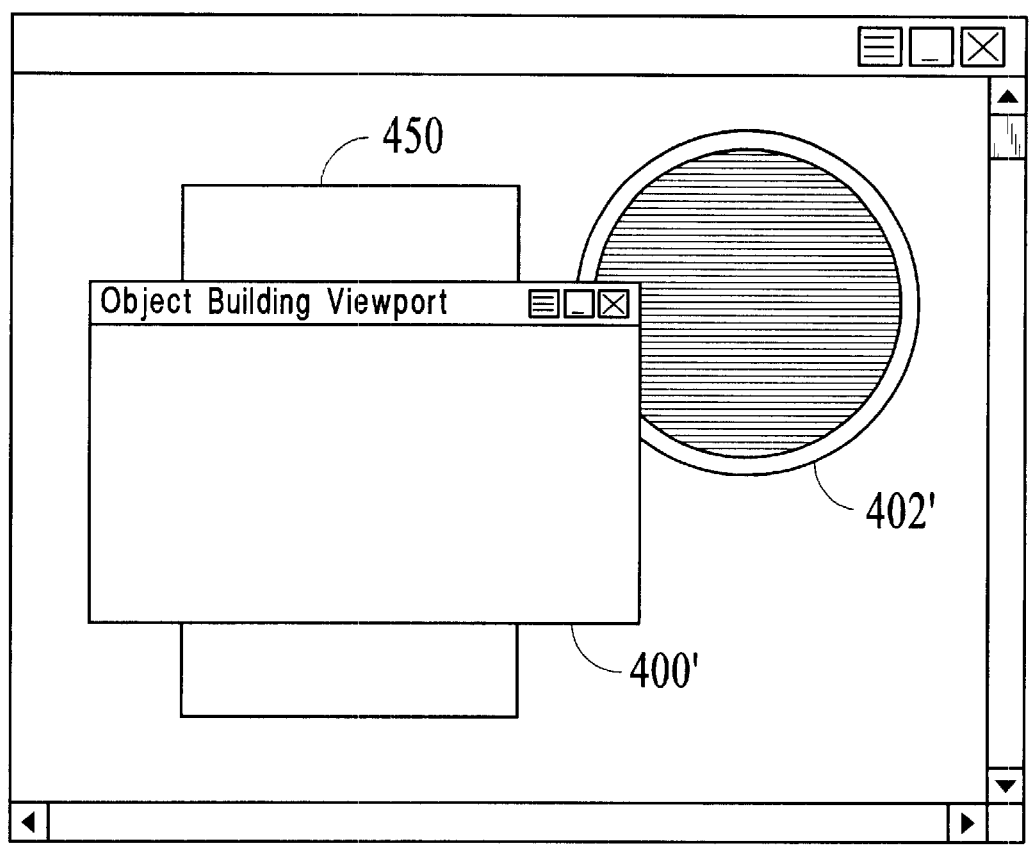
FIG. 16 represents another aspect of the system in accordance with the present invention.

Once the choices to include or exclude the various graphic objects have been made, the object building viewport may be freely resized and/or moved as before. The resulting effect is to display within the viewport only those graphic objects or portions thereof that have been selected for inclusion in the object building viewport that are coincident with the area defined by the object building viewport. For example, if the object building viewport is moved from a first portion of the graphical image to a second portion of the graphical image which is void of any included objects, the object building viewport will display only the background color of the application drawing area. Furthermore, the first portion of the graphical image that is no longer coincident with the area defined by the object building viewport is restored to a normal view. FIG. 16 depicts the a viewport configuration where the viewport 400' has been moved to a location where none of the included graphic objects of the image 402' are coincident with the area defined by the object building viewport 400'. Even though another graphical image 450 is beneath the viewport 400', no objects are displayed in the viewport 400' because none of the objects of that image 450 are included within this particular viewport 400'.

In other words, the object building viewport is simply viewing what is actually there beneath the viewport, but automatically making invisible those graphic objects or portions thereof extending within the viewport not selected for inclusion in the viewport. This simplified view facilitates graphic object visualization, selection and modification, unencumbered by the distortion or obfuscation created by graphic objects unnecessary to the editing or examining operation at hand.

Figure 17:
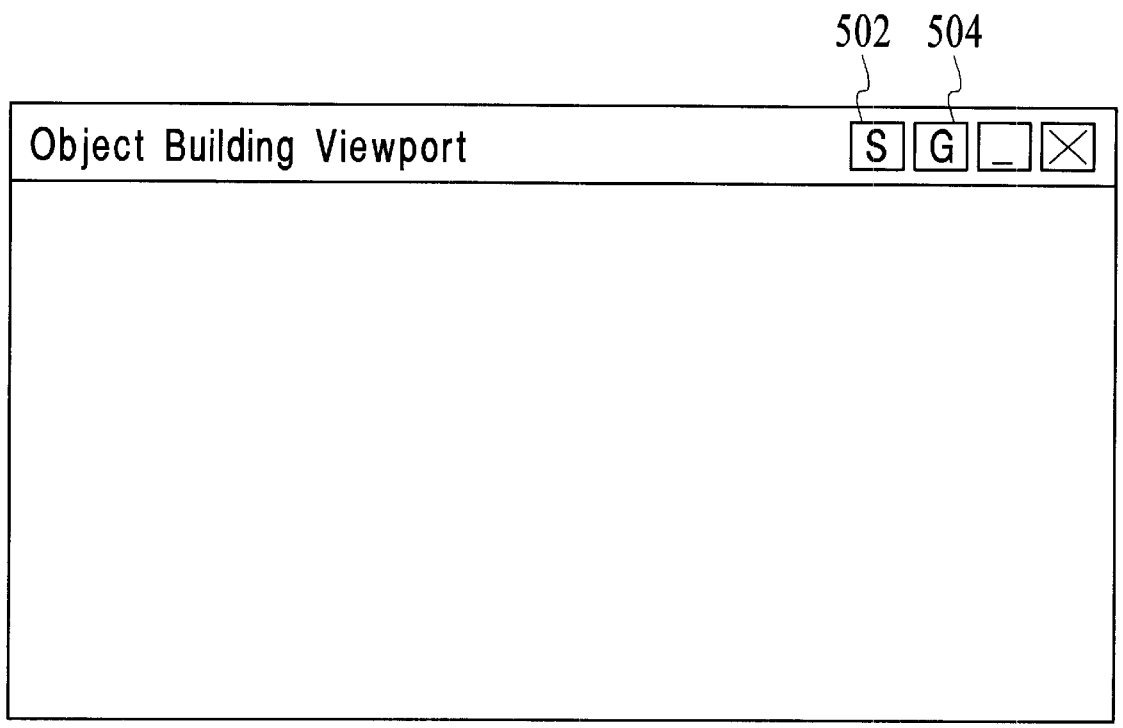
FIG. 17 is a view of another embodiment of a system in accordance with the present invention.

Another aspect of the preferred embodiment of the system and method in accordance with the present invention pertains to the grouping of graphic objects. Most computer graphic programs support the concept of "grouping" graphic objects together to behave as a single graphic object with respect to many operations such as selection, moving, resizing, deleting, etc. Accordingly, the object building viewport also supports "grouping" by adding and removing a "group" of graphic objects (previously defined as a group within the application) to the object building viewport as though they were a single graphic object. FIG. 17 shows an object building viewport 500 illustrative of this aspect. The object building viewport 500 preferably includes a single graphic object mode button 502 and a group mode button 504 that enables the user to choose the mode in which the object building viewport operates.

The "single graphic object" mode when selected, preferably ignores the grouping status with respect to the adding and deleting of graphic objects to/from the object building viewport. The "group object" mode preserves the original grouping of the objects and treats them as a single object. This special mode enables the user to create precisely the most convenient and beneficial view without having to ungroup and regroup graphic objects, which can be a very difficult task in complex drawings. This "single graphic object" mode is preferably accomplished by remembering the graphic objects comprising the group and automatically reestablishing the group when the object building viewport is closed.

A further enhancement of the object building viewport provides for "capturing" needed information when it becomes visible within the viewport. This is preferably accomplished by "right clicking" the mouse within the viewport which transforms the viewport to a "capture" window. The graphic objects displayed within the newly created capture window are now frozen and constant and allows the captured information to be relocated anywhere on the computer display by simply moving the capture window to any desired location on the desktop. This allows the user to capture pieces of the drawing scattered at various locations within the drawing and then collect them together by moving each capture window to a single area of the display for easy reference. Creating or relocating capture windows does not change the actual image or drawing in any way. Just like the viewport, only the view is affected but not the actual image.

The simplified view provided by the object building viewport facilitates graphic object visualization, selection and modification, unencumbered by the distortion or obfuscation created by graphic objects unnecessary to the editing operation at hand. Furthermore, since the creation of a simplified view does not actually change the image, the user will not be burdened by having to modify the location of graphic objects and remember specific operations in order to restore graphic object locations and relations back to their original state following the editing or examination.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed:

1. A method for a user to edit or view a graphical image, the graphical image comprising a plurality of graphic objects, comprising the steps of:
    (a) providing a view of at least one graphical image;
    (b) creating at least one viewport based upon a user interaction, wherein the viewport includes a toolbar, wherein the toolbar includes a minimize button, a minimize all button, and a close button, wherein the minimize button allows the user to make a viewport temporarily invisible by reducing the viewport to an icon on the toolbar; the minimize all button makes all viewports invisible, and the close button closes the viewport, wherein the view of the at least one graphical image at least partially within the viewport is displayed; and
    (c) excluding at least one of the plurality of graphic objects from the viewport based upon a user interaction to create a simplified view of the at least one graphical image.

2. The method of claim 1 further comprising the step of:
    (d) displaying the simplified view of the at least one graphical image within the viewport.

3. The method of claim 2 wherein the view of the at least one graphical image within the viewport can be changed by including at least one of the plurality of graphic objects based upon the user interaction.

4. The method of claim 1 wherein the creating step (b) further comprises:
    (b1) activating at least one viewport tool based upon a user interaction;
    (b2) creating the at least one viewport to encompass a portion of the graphical image based upon a first user interaction; and
    (b3) forming a view by displaying at least one of the plurality of graphic objects in the at least one viewport based upon a second user interaction.

5. The method of claim 4 wherein the creating step (b) further comprises:
    (b4) utilizing the changed view for editing.

6. The method of claim 1 wherein the at least one viewport can be resized.

7. The method of claim 2 wherein at least one of the plurality of graphic objects in the at least one viewport can be locked based upon a user interaction.

8. The method of claim 4 wherein a view of a first portion of the at least one graphical image coincident with the area defined by the viewport is restored to a normal view upon moving the viewport to a second portion of the at least one graphical image discontiguous with the first portion.

9. The method of claim 4 wherein a view of a first portion of the at least one graphical image coincident with the area defined by the viewport is restored to a normal view upon closing of the viewport.

10. The method of claim 1 wherein the at least one viewport includes a plurality of viewports.

11. A system for a user to edit or view a graphical image, the graphical image comprising a plurality of graphic objects, comprising:
    means for providing a view of at least one graphical image;

means for creating at least one viewport based upon a user interaction, wherein the viewport includes a toolbar, wherein the toolbar includes a minimize button, a minimize all button, and a close button, wherein the minimize button allows the user to make a viewport temporarily invisible by reducing the viewport to an icon on the toolbar; the minimize all button makes all viewports invisible, and the close button closes the viewport, wherein the view of the at least one graphical image at least partially within the viewport is displayed; and means for excluding at least one of the plurality of graphic objects from the viewport based upon a user interaction to create a simplified view of the at least one graphical image.

12. The system of claim 11 further comprising means for displaying the simplified view of the at least one graphical image within the viewport.

13. The system of claim 12 wherein the view of the at least one graphical image within the viewport can be changed by including at least one of the plurality of graphic objects based upon the user interaction.

14. The system of claim 11 wherein the means for creating the at least one viewport further comprises:

means for activating at least one viewport tool based upon a user interaction;

means for creating the at least one viewport to encompass a portion of the graphical image based upon a first user interaction; and means for forming a view by displaying at least one of the plurality of graphic objects in the at least one viewport based upon a second user interaction.

15. The system of claim 14 wherein the means for creating the at least one viewport further comprises:

means for utilizing the changed view for editing.

16. The system of claim 11 wherein the at least one viewport can be resized.

17. The system of claim 12 wherein at least one of the plurality of graphic objects in the at least one viewport can be locked based upon a user interaction.

18. The system of claim 14 wherein a view of a first portion of the at least one graphical image coincident with the area defined by the viewport is restored to a normal view upon moving the viewport to a second portion of the at least one graphical image discontiguous with the first portion.

19. The system of claim 14 wherein a view of a first portion of the at least one graphical image coincident with the area defined by the viewport is restored to a normal view upon closing of the viewport.

20. The system of claim 11 wherein the at least one viewport includes a plurality of viewports.

21. A computer readable medium for a user to edit or view a graphical image, the graphical image comprising a plurality of graphic objects, the program instructions comprising the steps of:

(a) providing a view of at least one graphical image;

(b) creating at least one viewport based upon a user interaction, wherein the viewport includes a toolbar, wherein the toolbar includes a minimize button, a minimize all button, and a close button, wherein the minimize button allows the user to make a viewport temporarily invisible by reducing the viewport to an icon on the toolbar; the minimize all button makes all viewports invisible, and the close button closes the viewport, wherein the view of the at least one graphical image at least partially within the viewport is displayed; and (c) excluding at least one of the plurality of graphic objects from the viewport based upon a user interaction to create a simplified view of the at least one graphical image.

22. The computer readable medium of claim 21 further comprising the step of (d) displaying the simplified view of the at least one graphical image within the viewport.

23. The computer readable medium of claim 22 wherein the view of the at least one graphical image within the viewport can be changed by including at least one of the plurality of graphic objects based upon the user interaction.

24. The computer readable medium of claim 21 wherein the creating step (b) further comprises:

(b1) activating the at least one viewport based upon a user interaction;

(b2) creating the at least one viewport to encompass a portion of the graphical image based upon a first user interaction; and (b3) forming a view by displaying at least one of the plurality of graphic objects in the at least one viewport based upon a second user interaction.

25. The computer readable medium of claim 24 wherein the creating step (b) further comprises:

(b4) utilizing the changed view for editing.

26. The computer readable medium of claim 21 wherein the at least one viewport can be resized.

27. The computer readable medium of claim 22 wherein at least one of the plurality of graphic objects in the at least one viewport can be locked based upon a user interaction.

28. The computer readable medium of claim 24 wherein a view of a first portion of the at least one graphical image coincident with the area defined by the viewport is restored to a normal view upon moving the viewport to a second portion of the at least one graphical image discontiguous with the first portion.

29. The computer readable medium of claim 24 wherein a view of a first portion of the at least one graphical image coincident with the area defined by the viewport is restored to a normal view upon closing of the viewport.

30. The computer readable medium of claim 21 wherein the at least one viewport includes a plurality of viewports.

\* \* \* \* \*